United States Patent
Haverkamp

(10) Patent No.: US 6,729,687 B2
(45) Date of Patent: May 4, 2004

(54) FASTENING DEVICE FOR CHILD SEAT ON A MOTOR VEHICLE SEAT

(75) Inventor: Michael Haverkamp, Hannover (DE)

(73) Assignee: Faurecia Autositze GmbH & Co. KG (DE)

( * ) Notice: Subject to any disclaimer, the term of this patent is extended or adjusted under 35 U.S.C. 154(b) by 0 days.

(21) Appl. No.: 10/395,945

(22) Filed: Mar. 24, 2003

(65) Prior Publication Data

US 2003/0184138 A1 Oct. 2, 2003

(30) Foreign Application Priority Data

Mar. 27, 2002 (DE) .......................... 102 13 655

(51) Int. Cl.$^7$ ................................ A47C 1/08
(52) U.S. Cl. ............... 297/254; 297/188.06; 297/463.1
(58) Field of Search .................. 297/188.06, 188.2, 297/254, 253, 250.1, 463.1, 463.2

(56) References Cited

U.S. PATENT DOCUMENTS

| | | | | |
|---|---|---|---|---|
| 5,332,285 A | * | 7/1994 | Sinnhuber | 297/250.1 |
| 5,630,645 A | * | 5/1997 | Lumley et al. | 297/250.1 |
| 5,695,243 A | * | 12/1997 | Anthony et al. | 297/250.1 |

FOREIGN PATENT DOCUMENTS

| | | | |
|---|---|---|---|
| DE | 39 06 844 A1 | * | 3/1990 |
| DE | 196 12 232 A1 | * | 10/1997 |
| DE | 298 20 475 U1 | | 2/1999 |
| DE | 201 17 074 U1 | | 2/2002 |
| WO | WO 01/36226 A2 | | 5/2001 |

* cited by examiner

*Primary Examiner*—Laurie K Cranmer
(74) *Attorney, Agent, or Firm*—Synnestvedt, Lechner & Woodbridge LLP; Richard C. Woodbridge, Esq

(57) ABSTRACT

The present device relates to a fastening device for a child seat on a motor vehicle seat provided, in the upper region of its back rest, with guides for inserting a head rest, said fastening device consisting of a holder firmly affixed to the back rest, and a holding means is provided which connects said holder to the upper region of the back mould of the child seat. The object is to provide such a fastening device which can be used independently of the location where a vehicle seat is mounted inside a passenger compartment and, moreover, provides a fastening point for a so-called "top tether" sufficiently located towards the back meeting the requirements of applicable safety regulations. This task is solved in that the holder firmly affixed to the back rest consists of a first region (3.1) insertable into the head rest guides (2), and from the first region protrudes a further region (3.2, 3.3) in an angular manner towards the back which further region is provided with a fixation point for the holding means.

3 Claims, 3 Drawing Sheets

FASTENING DEVICE FOR CHILD SEAT ON A MOTOR VEHICLE SEAT

CROSS REFERENCE TO RELATED APPLICATIONS

This application claims the priority of German Patent Application 102 13 656.6 filed Mar. 27, 2002 and entitled "Fastening Device For Child Seat On A Motor Vehicle Seat" by Michael Haverkamp, the entire contents and substance of which are hereby incorporated in total by reference.

FIELD OF THE INVENTION

The invention relates to a fastening device for a child seat on a motor vehicle seat.

BACKGROUND OF THE INVENTION

Restraint systems for child seats located on a motor vehicle seat are known in many embodiments. In earlier times it was customary to utilize herefor the safety belt system of the vehicles which was present in the vehicle anyway. However, such systems bear the disadvantage that the connection between the child seat and the vehicle seat may loosen over time due to the flexibility of both upholstery and belt, allowing the child seat some movement on its own. Therefore, in recent years systems are in use, in which the holders for the child seat are rigidly connected to the structure of the seat or the vehicle. Such systems have become known to the experts as "Isofix" child seat fasteners. Due to the rigid connection such fasteners are not subject to loosening, so that own movement of the child seat, as discussed above, is essentially impossible.

However, even with "Isofix" fasteners a child seat may not be prevented from pivoting forward through the resilience of the upholstery in the case of strong braking deceleration forces occuring, for example, in the event of a front crash. This pivoting motion may lead to injury in the cervical spine of a child sitting in the child seat, commonly referred to as cervical trauma. Of course, this danger also exists with other types of fasteners of child seats.

In order to overcome this danger so-called "top tethers" have been developed. Top tethers are restraining means connecting the upper part of the back mould of a child seat with rear fasteners affixed to the vehicle or to the motor vehicle seat. Such a generic fastening device was described in DE 298 20 475 U1. In one embodiment of the invention disclosed in the aforementioned citation the fastening device consists of two hook shaped fastening means held at the upper front side of the back mould of the child seat. The free ends of the hooks can be removably inserted into the guides of a head rest fastener following the prior removal of the head rest from these guides. In another embodiment of the invention cited belts are used instead of hook shaped fastening means, and buckles are provided at the ends of such belts which can be inserted into buckle tongues. These buckle tongues are penetrated by the carrier arms of the head rest. In a further embodiment of the invention cited the belts are replaced by rods, one end of which is pivotingly affixed to the upper front side of the back mould of the child seat with the other end being provided with an aperture which is in turn penetrated by a holding rod of the head rest.

A fastening device similar to the one described above has been described in DE 201 17 074 U1. Herein, the fastening device consists of a fixing belt affixed to the back side of the head rest of the child seat. Said fixing belt is designed so as to consist of two parts and is provided at each of its two free ends with a buckle or a buckle tongue respectively by means of which the fixing belt can be closed in a known manner. In order to fasten the upper region of the child seat, the two ends of the fixing belt are manipulated around the holder rods of the head rest of the motor vehicle seat and joint via the belt buckle. The length of the belt loop can be shortened by pulling one end of the belt in a known manner until the fixing belt is in form-fit contact with the holder rods.

In these known solutions the holding means of the head rest of the motor vehicle seat, i.e. the guides and/or the holders, are utilized directly for fixing the upper region of the child seat.

Safety regulations of some countries prescribe certain requirements for the fastening location of the "top tether", whereby these requirements depend upon certain seat related reference points. The solutions described above are unsuitable for meeting such demands because the respective fastening region lies too close to the reference points.

WO 01/36226 A2 discloses a system for anchoring objects at or on a motor vehicle seat. One embodiment of this system relates also to the fastening of a child seat on a motor vehicle seat. Besides an "Isofix" fastener in the lower region of the child seat there is provided a "top tether" conncetion. The belt used herein as holding means is affixed at its one end to the upper side of the back mould of the child seat and at its other end bound to a holder ring which is in turn affixed to a structural part of the passenger compartment of the vehicle. This solution is capable of meeting the above safety requirements because the location of fixation of the end of the holder belt which faces away from the back mould can be designed to be spaced sufficiently away from the seat reference points. However, this solution is not suited for front seats because there are no sufficient corresponding fixation points of the support structure of the passenger compartment available in the front. A further disadvantage can be seen in that the structure of the passenger compartment must have sufficient rigidity at the point of fixation of the holding belt in order to withstand the forced excerted during a front crash. This demand may not always be met, for example, in the case of the parcel shelf behind the back seat of a passenger sedan.

SUMMARY OF THE INVENTION

The present invention is based upon the object of providing a fastening device of the generic type which can be used independently of the location where a vehicle seat is mounted inside a passenger compartment and, moreover, provides a fastening point for a so-caclled "top tether" sufficiently located towards the back meeting the requirements of applicable safety regulations.

Thus, the fastening device according to the invention can be inserted, with its first region, into the guides for the head rest provided in the upper region of the back rest of the motor vehicle seat after removal of the head rest from these guides. The further region of the fastening device then protrudes towards the back so that the fastening point provided here is located sufficiently towards the back, i.e. that the distance from the relevant seat reference points prescribed by applicable safety regulations can be met. While in the state of the art the head rest holders or their guides respectively serve directly as fixation points for the holding means connected to the upper region of the back mould, in the present invention the head rest guides are utilized merely indirectly in that they serve as fixations for the fastening device at the back rest. The fastening device according to the invention can be used both with front as well as back seats.

BRIEF DESCRIPTION OF THE DRAWINGS

The invention shall be hereafter illustrated further by means of a preferred embodiment.

DETAILED DESCRIPTION

Figure 1:
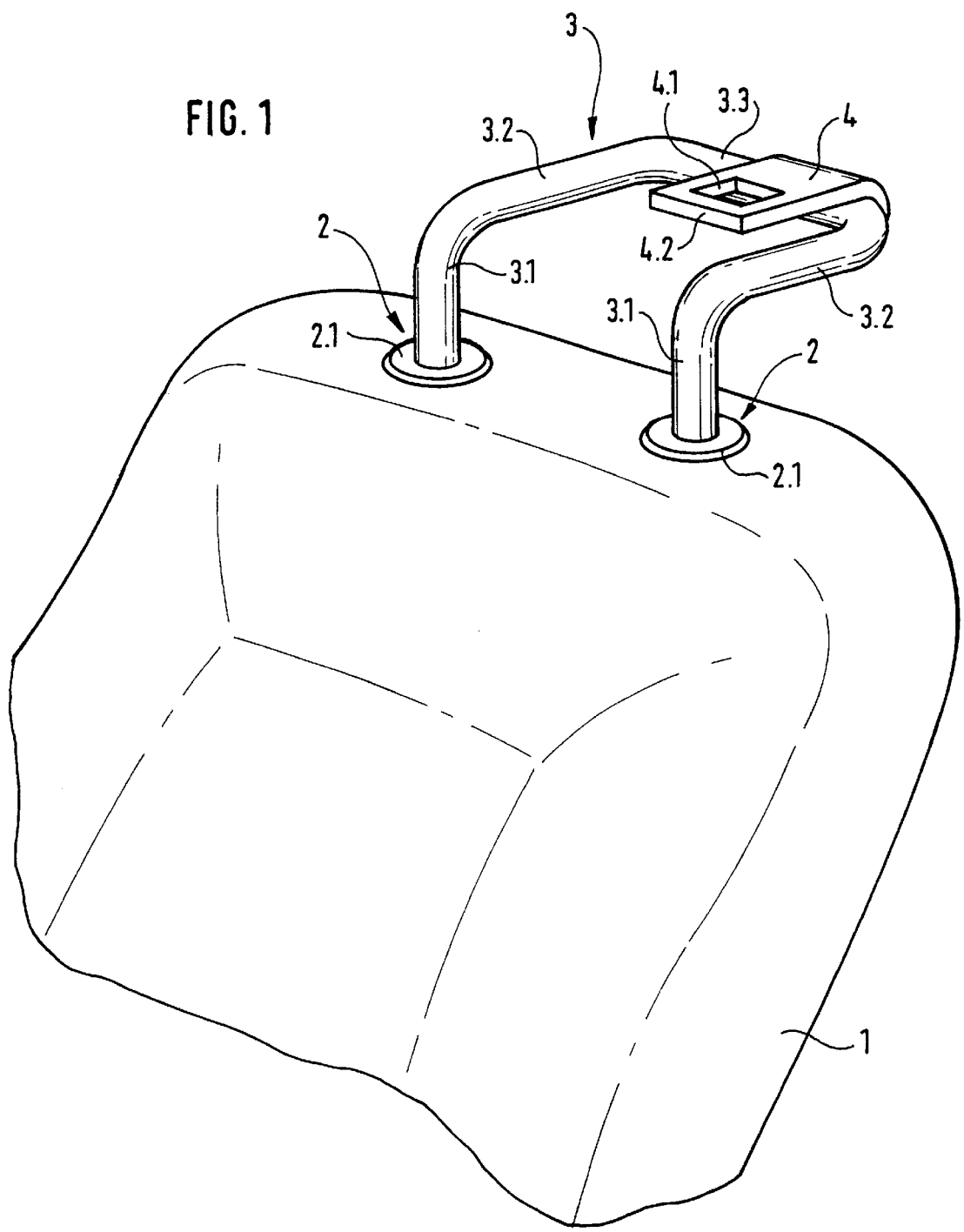
FIG. 1 is a perspective angular front view of the upper region of a back rest of a motor vehicle seat with a fastening device inserted into the head rest guides, shown without upholstery.

The back rest 1, shown in FIG. 1, of a motor vehicle seat not shown otherwise is provided at the upper edge of the rest with two head rest guides 2 of which only the cover rims 2.1 lying on top of the upper edge of the rest can be seen in FIG. 1. The head rest guide 2 is each provided with a guide pipe penetrating the back rest 1 which pipe is connected with a support structure (not shown) of the back rest 1. This is not shown here as it represents the state of the art which is well known to the expert in the art.

In the drawing of FIG. 1 a head rest otherwise affixed to the back rest has been removed therefrom already, and a fastening device 3 has been mounted. This device comprises a first region 3.1 consisting of two spaced apart rods. The spacing of these rods corresponds to the spacing of the head rest guides 2, and the thickness of the rods corresponds to the thickness of the holding rods of the head rests. Thus, the device 3 can simply be inserted into the head rest guides. The two rods of the first region 3.1 lead, in an approximately right angled curve, to a further region 3.2 of the fastening device 3. Hereby, the spacing between the two rods of the first region 3.1 as well as their cross-section is maintained. At its back end, the further region 3.2 is closed by means of a tie bar 3.3. The tie bar 3.3 connects through radii of curvature with the same cross-section with the rods of the further region 3.2. The regions 3.1 and 3.2 of the fastening device 3 are designed to be in one piece, with the tie bar 3.3 belonging to the region 3.2.

Figure 3:
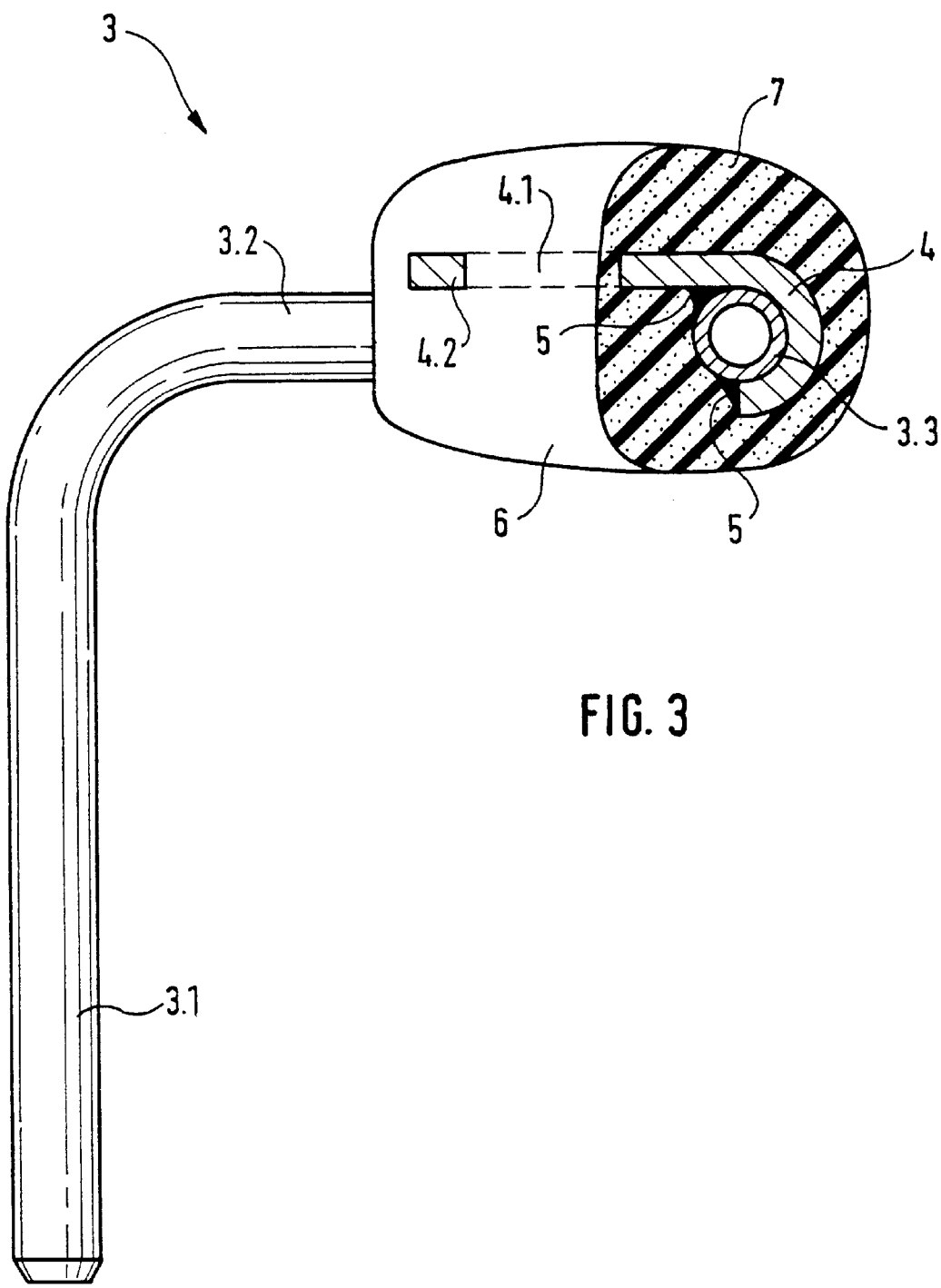
FIG. 3 is a section III—III shown in to FIG. 2.

A holding frame 4 is attached by weldings 5 to the tie bar 3.3 (FIG. 3). This holding frame 4 consists of a flat steel piece exhibiting in its front region an aperture 4.2 of approximately rectangular shape 4.1, creating a front-side holder bar 4.2 on the holding frame 4.

Figure 2:
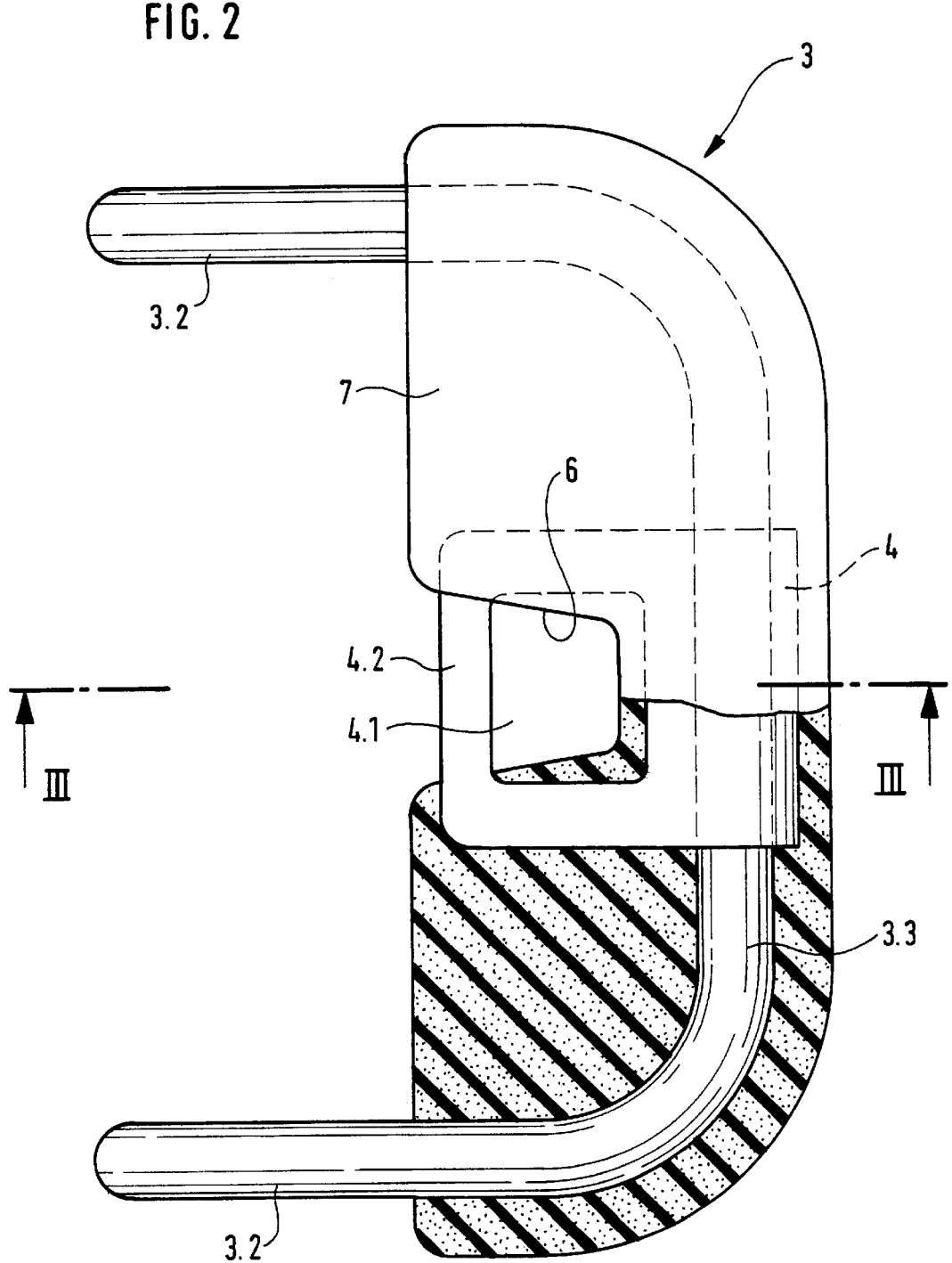
FIG. 2 is an enlarged elevation of the fastening device with upholstery, with the right hand side of the picture shown in section.

In its back-side region 3.2 the fastening device 3 is covered by upholstery. The upholstery 7 is shown in FIGS. 2 and 3. The upholstery of the fastening device 3 in its back-side region is required because, in the event of a front crash a back seat passenger may hit the fastening device 3 with his head. The upholstery 7 is provided as a "self skinning foam". As can be seen from the depictions according to FIGS. 2 and 3, the back-side section of the further region 3.2 as well as the holding frame 4 are foam covered. In order to allow access to the holder bar 4.2 of the holding frame 4, a channel 6, running through the upholstery from top to bottom, is provided in the upholstery 7 at its front side, i.e. at the side facing the back rest 1 in the region of the holding frame 4.

A child seat (not shown) is fastened at the fastening device by means of a holding means (not shown) connected to the upper region of the back mould of the child seat. Said holding means may be, for example, a belt whose free end is provided with a locking device which can be detachably coupled to the bar 4.2 of the holding frame 4. Of course, the child seat is also affixed to the motor vehicle seat by means of other fastening means, e.g. an "Isofix" connection, which are of no relevance to the present invention.

What is claimed is:

1. A fastening device for a child seat on a motor vehicle seat having a front and a back and provided, in the upper region of its back rest, with guides for inserting a head rest, said fastening device consisting of a holder firmly affixed to the back rest, and a holding means which connects said holder to the upper region of said child seat, wherein said holder, which is firmly affixed to said back rest, comprises a first region insertable into said head rest guides, and, from said first region protrudes a further region in an angular manner towards said back of said motor vehicle seat, which further region is provided with a fixation point for said holding means and, wherein said further region is provided with upholstery, whereby said upholstery leaves a free front-side access to said fixation point.

2. The fastening device of claim 1, wherein said fixation point comprises a holder bar of a holding frame affixed to a further region.

3. The fastening device of claim 2, wherein said fixation point comprises a holder bar of a holding frame affixed to a further region.

* * * * *